June 3, 1930.  A. A. THOMAS  1,761,647

CHAIN FASTENER

Filed May 18, 1929

INVENTOR
Albin A. Thomas,
By Archworth Martin,
Attorney.

Patented June 3, 1930

1,761,647

UNITED STATES PATENT OFFICE

ALBIN A. THOMAS, OF YORK, PENNSYLVANIA, ASSIGNOR TO UNITED STATES CHAIN & FORGING COMPANY, OF PITTSBURGH, PENNSYLVANIA, A CORPORATION OF DELAWARE

CHAIN FASTENER

Application filed May 18, 1929. Serial No. 364,200.

My invention relates to chain fasteners, and more particularly to tightening and connecting devices such as are employed on fastening the side chains of anti-skid chain structures that are employed on automobile wheels, but it is capable of use in various other relations.

One object of my invention is to provide a fastening device of the type referred to that is more freely operable than various types which have heretofore been employed and which nevertheless securely retains the connected links against accidental displacement.

Another object of my invention is to provide a fastening device wherein the necessity for snug-fitting movable parts which are difficult of operation through the presence of grit, rust, etc., is avoided.

Figure 1:
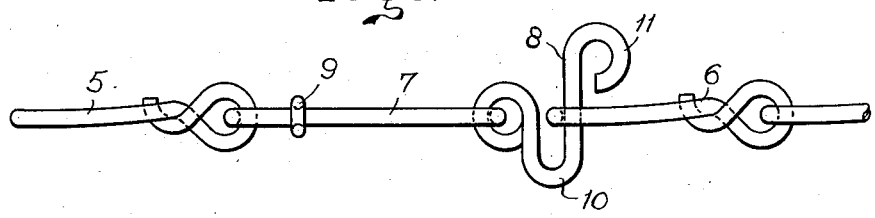
Figure 2:
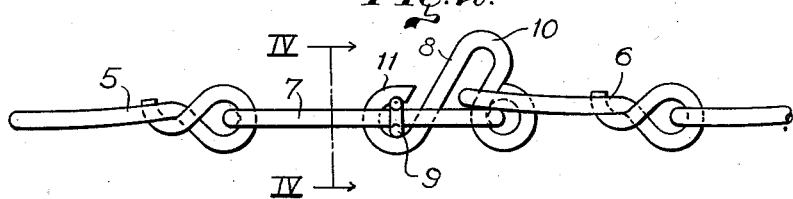
Figure 3:
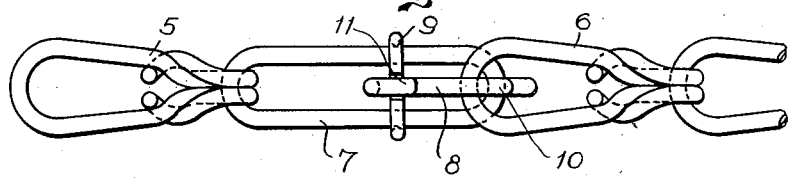

One form which my invention may take is shown in the accompanying drawing, wherein Figure 1 is a side elevational view of the device in partially open position; Fig. 2 is a view similar to Fig. 1, but showing the parts in locked position; Fig. 3 is a plan view of the structure of Fig. 2, and Fig. 4 is a view taken on the line IV—IV of Fig. 2.

The fastener is shown as employed for connecting end links 5 and 6 of a side chain or the like and comprises a connector link 7, a latching lever 8, and a keeper 9.

Figure 4:
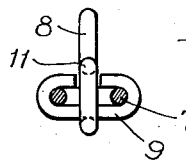

The connecter link 7 is shown as having permanent connection with the chain link 5, while the lever 8 has loose connection with the link 7 so as to have free pivotal movement thereon, while the keeper or catch 9 partially embraces the sides of the link 7 as shown more clearly in Fig. 4, and is freely slidable thereon.

The lever 8 has a bent portion 10 which serves as a seat for the link 6 and a hook portion 11 that is engaged by the keeper 9 when the lever is in closed position, as shown in Fig. 2.

In effecting connection between the links 5 and 6, the free end of the lever 8 is passed through the link 6 as shown in Fig. 1, and is then swung to the left until its hook portion 11 extends below the plane of the connecting link 7, whereupon the keeper 9 is shifted from the position shown in Fig. 1 to the position shown in Fig. 2. The lever 8 may then be permitted to swing slightly in a clockwise direction under the tension of the chain links 5 and 6.

The keeper 9 is not likely to become accidentally disengaged from the hook 11 through slackening of the chain links, since if the connecting link 7 is in a horizontal position when such slackness occurs, the keeper 9 obviously will remain in the position shown in Fig. 2, while if the right hand end of the link 7 is elevated at a time when slackness occurs, the lower portion of the keeper will slide into the hook 11 and thus be held against movement to the position shown in Fig. 1. On the other hand, if the left hand end of the link 7 is in elevated position when the chain is slack, the keeper 9 will slide toward the right hand end of the link and lie against the body portion of the lever 8, so that when a pull is again exerted on the hook, the keeper will be forced into the locking position shown in Fig. 2.

The ends of the keeper 9 are spaced apart such distance that the extremity of the hook 11 may pass between the same and permit the lower straight portion of the keeper to move into the bend of the hook.

The parts 7 and 8 may be formed of wire stock that is little if any heavier than the stock from which the chain links 5 and 6 are formed, and it will be seen that the arrangement of the parts is such that the fastener as a whole does not occupy space much greater than that required for ordinary chain links, thus avoiding excessive protuberances which are objectionable at the sides of a tire.

I claim as my invention:—

1. A chain fastener comprising a connecting link of elongated loop form, a latch lever pivotally connected at one of its ends to one end of said link and having its free end movable between and to a point below the sides of the loop, and a keeper of yoke-like form having each of its ends partially embracing one side of the loop and slidable longitudinally of the loop in position above the free end of the lever when said lever is in closed position.

2. A chain fastener comprising a connecting link of elongated loop form, a latch lever pivotally connected at one of its ends to one end of the link, the other end of the lever being bent backward to hook form, an offset portion intermediate the ends of the lever to serve as a seat for a chain link, and a keeper slidably mounted on the connecting link, the hook portion of the lever being movable between and to a point below the sides of the loop.

3. A chain fastener comprising a connecting link of elongated loop form, a latch lever pivotally connected at one of its ends to one end of the link, the other end of the lever being bent backward to hook form, an offset portion intermediate the ends of the lever to serve as a seat for a chain link, and a keeper slidably mounted on the connecting link, the hook portion of the lever being movable between and to a point below the sides of the loop, and the said keeper comprising a yoke-like member with its ends upturned and partially overlying the loop, but spaced apart a distance to permit passage of the outer end of the hook portion therebetween.

In testimony whereof I, the said ALBIN A. THOMAS, have hereunto set my hand.

ALBIN A. THOMAS.